(12) United States Patent
Shibata et al.

(10) Patent No.: US 6,648,199 B2
(45) Date of Patent: Nov. 18, 2003

(54) PINCH ROLLER DEVICE (75) Inventors: Atsushi Shibata, Osaka (JP); Tsukasa Shinmi, Osaka (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 10/077,037

(22) Filed: Feb. 15, 2002

(65) Prior Publication Data

US 2002/0125288 A1 Sep. 12, 2002

(30) Foreign Application Priority Data

Feb. 15, 2001 (JP) .................................. 2001-000657 U (51) Int. Cl.⁷ .............................................. B65H 20/00
(52) U.S. Cl. ..................... 226/194; 226/194; 226/186
(58) Field of Search ................................ 226/194, 186

(56) References Cited

U.S. PATENT DOCUMENTS 5,896,240 A * 4/1999 Yamazaki et al. ...... 226/194 X
6,149,044 A * 11/2000 Machino .................... 226/194
6,419,139 B1 * 7/2002 Shibata et al. ............. 226/194
6,467,669 B1 * 10/2002 Okada ........................ 226/194

FOREIGN PATENT DOCUMENTS

JP 62-117735 7/1987
JP 1-287853 11/1989

OTHER PUBLICATIONS

Patent Abstracts of Japan (1 page), Publication No. 01-287853, Publication Date Nov. 20, 1989, 1 page.

* cited by examiner

*Primary Examiner*—Michael R. Mansen
(74) *Attorney, Agent, or Firm*—Rosenthal & Osha L.L.P.

(57) ABSTRACT

A pinch roller device is provided wherein an elastic cylindrical roller is fitted over a cylindrical holder 1, in the inner wall of which are formed a small hole 1a and a large hole b 1b; wherein a bearing 3 is fitted in the large hole 1b and a bearing stopper sleeve 4 is pressed into the large hole 1b, so that the bearing 3 can be rotatably fitted over a roller shaft.

5 Claims, 7 Drawing Sheets

PINCH ROLLER DEVICE

BACKGROUND OF THE INVENTION

The present invention relates to a pinch roller device for pressing magnetic tape against a capstan used for a VTR or a tape recorder.

Figure 4:
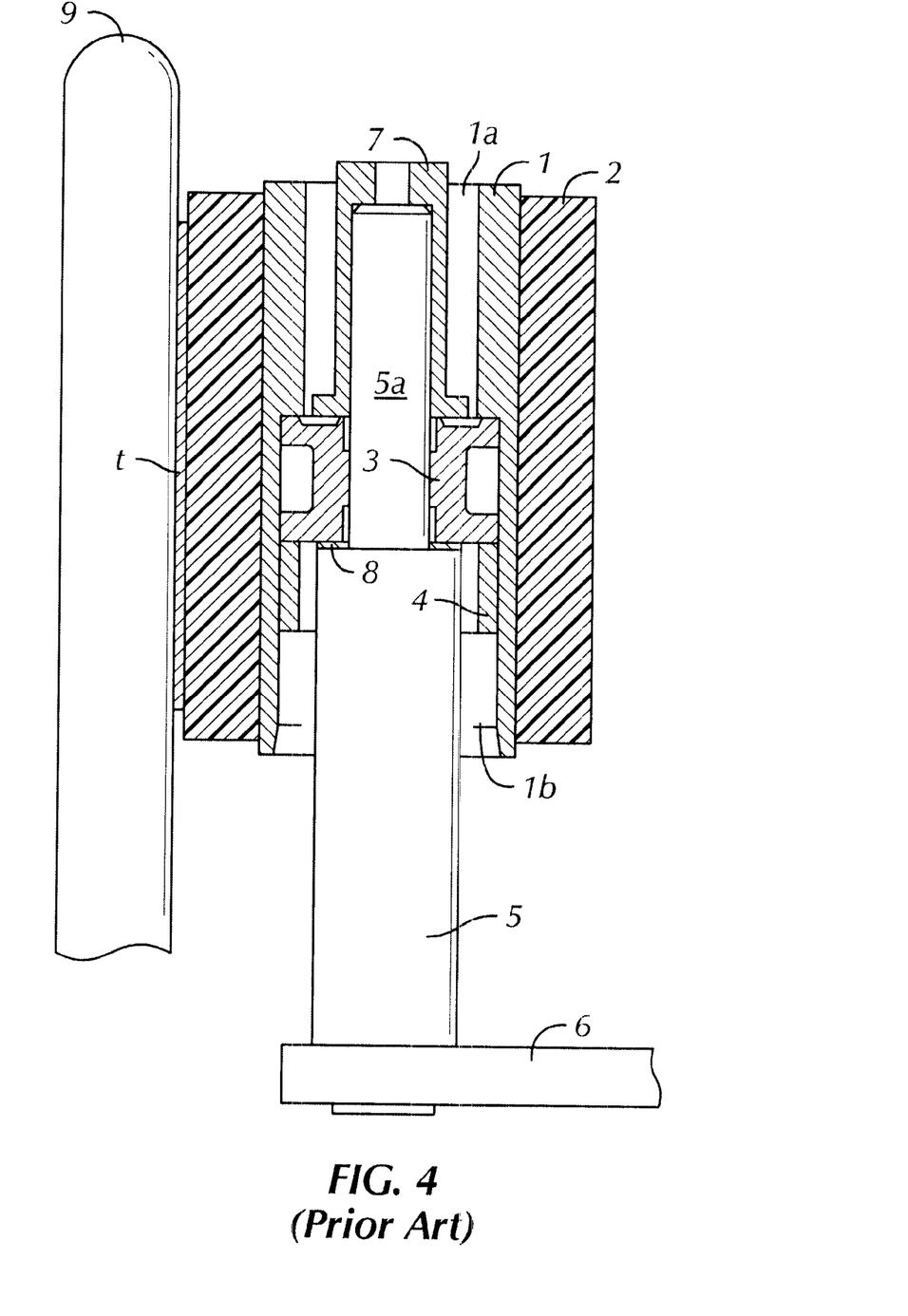
FIG. 4 is a vertical cross-sectional view of a conventional pinch roller device.

An example conventional pinch roller device is the one disclosed in the Unexamined Japanese Utility Model No. Sho62-117735. As is shown in FIG. 4, an elastic cylindrical roller 2 composed of elastic rubber is fitted over a cylindrical metal, such as brass, holder 1 wherein a small hole 1a and a large hole 1b are internally formed. A bearing 3 is fitted into the small hole 1a, and a bearing stopper sleeve 4 is fitted into the large hole 1b, so that the bearing 3 is rotatably fitted over a small diameter upper end 5a of a roller shaft 5. A swivel lever 6 supports the roller shaft 5, and additionally provided for the pinch roller device are a stopper cap 7, a washer 8 and a capstan 9, which engages a magnetic tape t.

With this arrangement, when the swivel lever 6 is swiveled in a reproduction mode, it presses the roller 2 against the capstan 9, via the magnetic tape t, so that as the capstan 9 is rotated the magnetic tape t is conveyed and information can be read from it.

In the conventional configuration, since the holder 1 is composed of a metal, such as brass, it is not deformed when the bearing 3 and the sleeve 4 are forcibly pressed into the large hole 1b. Accordingly, since the outer wall of the elastic cylindrical roller 2 that is fitted over the holder 1 is also not deformed, it uniformly contacts the magnetic tape t across its breadth, thereby facilitating the smooth and even conveyance of the magnetic tape t.

However, since an expensive metal, such as brass, is employed for the holder 1, and since to secure the roller 2 to the holder 1 an adhesive coating is applied to the outer wall of the holder 1 and the roller 2 and the holder 1 are then baked, the expenses for the material and the great amount of labor required during the manufacturing process are high, and the production costs are increased.

Figure 5:
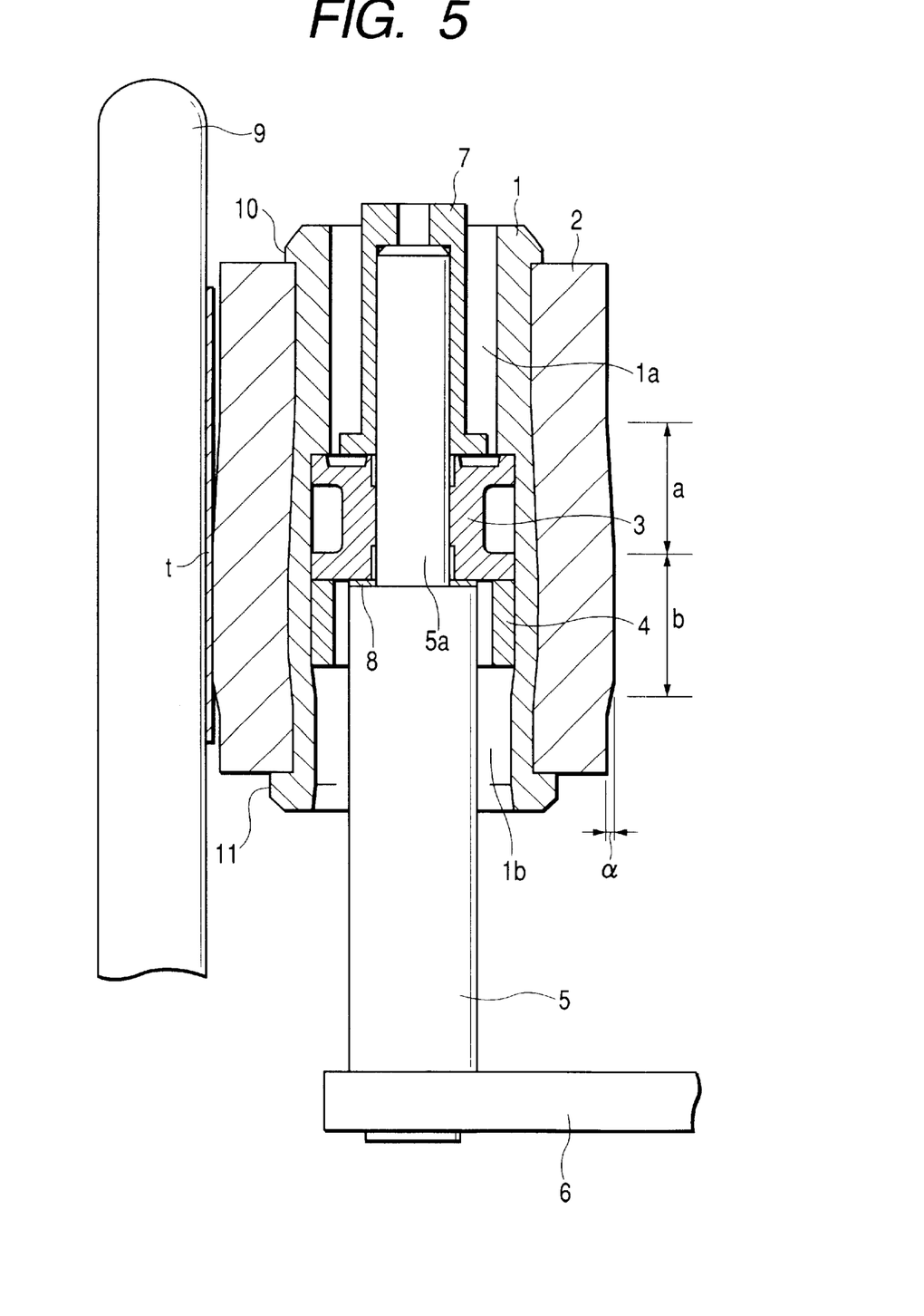
FIG. 5 is a vertical cross-sectional view of another conventional pinch roller device.
Figure 6A:
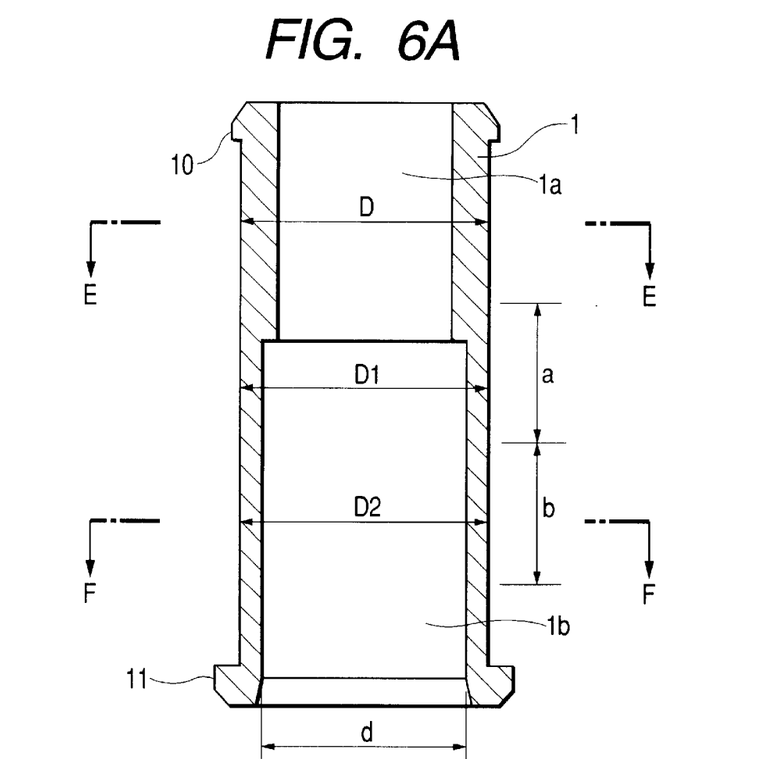
FIG. 6A is a vertical cross-sectional view of a holder in FIG. 5.
Figure 6B:
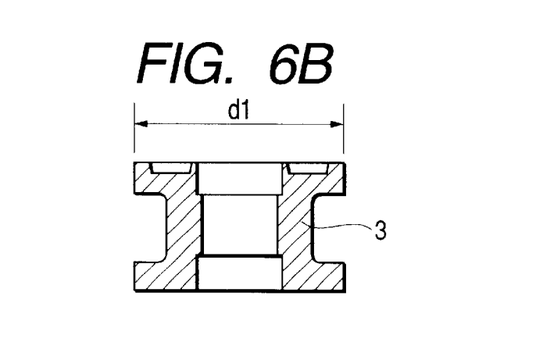
FIG. 6B is a vertical cross-sectional view of a bearing in FIG. 5.
Figure 6C:
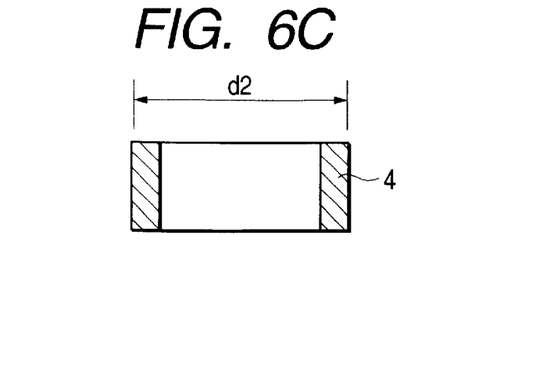
FIG. 6C is a vertical cross-sectional view of a sleeve in FIG. 5.
Figure 7A:
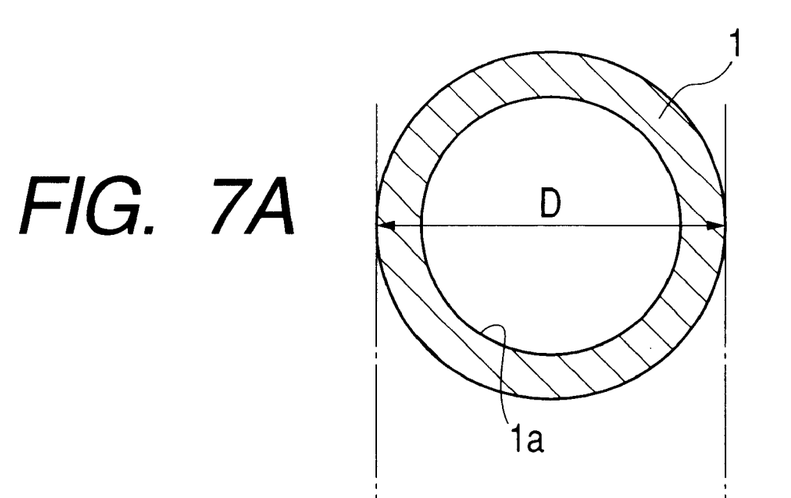
FIG. 7A is a diagram viewed in direction E—E in FIG. 6.
Figure 7B:
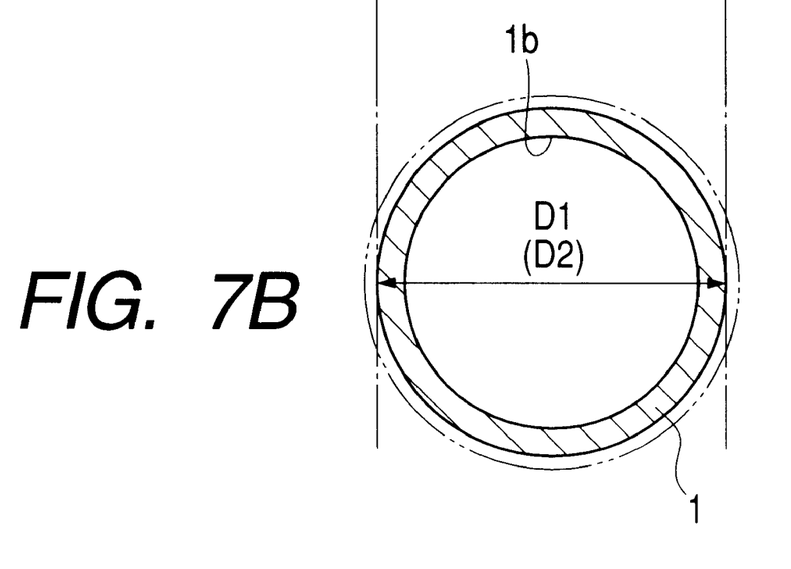
FIG. 7B is a diagram viewed in direction F—F in FIG. 6.

Thus, it has been proposed that an inexpensive, mass-produced synthetic resin be used for the holder 1. However, when simply the material of the holder 1 is changed, the following problems are encountered. As is shown in FIGS. 5 to 7, when for the holder 1, for which roller holding jaws 10 and 11 are integrally formed at the respective upper and lower ends, the outer diameters D1 and D2 of a bearing accepting portion a and a sleeve accepting portion b are set so that they correspond to the reference outer diameter D of the holder 1, while the inner diameter d of the large hole 1b is set so it is slightly smaller than the outer diameters d1 and d2 of the bearing 3 and the sleeve 4, when the bearing 3 and the sleeve 4 are forcibly pressed into and fitted in the large hole 1b, as is shown, although slightly exaggerated, in FIG. 5 the bearing accepting portion a and the sleeve accepting portion b of the holder 1 are flexibly deformed and diametrically expanded, and accordingly, a portion of the outer wall of the roller 2, which is fitted over the holder 1, is also diametrically expanded.

Since the width a of the diametrical expansion of the portion of the roller 2 is about 0.1 mm, i.e., too small to be perceived visually, the presence in the design of the expanded portion is ignored. And as a result, when the expanded portion of the roller 2 is pressed firmly against the magnetic tape t, sufficient pressure is applied to shift the tape t upward or downward and to destabilize its travel and produce noise, or to shift the magnetic tape t upward or downward so that either its upper or lower edge is forced against a guide post and damaged.

To resolve the conventional shortcomings, it is one objective of the present invention to provide an inexpensive pinch roller device that can smoothly and stably convey a magnetic tape.

SUMMARY OF THE INVENTION

To achieve this objective, according to a first aspect of the invention, a pinch roller device is provided wherein an elastic cylindrical roller is fitted over a cylindrical holder, in the inner wall of which are formed a small hole and a large hole; wherein a bearing is fitted in the large hole and a bearing stopper sleeve is pressed into the large hole, so that the bearing can be rotatably fitted over a roller shaft; wherein the elastic cylindrical holder is formed of an elastic synthetic resin; wherein the outer diameter of a sleeve accepting portion of the elastic cylindrical holder is set 0.2 mm±0.05 mm smaller than the reference outer diameter of a portion other than a sleeve accepting portion and a bearing accepting portion of the elastic cylindrical holder; and wherein the outer diameter of the bearing accepting portion is set 0.1 mm±0.05 mm smaller than the reference outer diameter.

According to this arrangement, since the outer diameter of the bearing accepting portion of the holder is 0.1 mm±0.05 mm smaller than the reference outer diameter of the holder, when the outer diameter of the bearing is 0.1 mm±0.05 mm larger than the inner diameter of the large hole of the holder, the bearing can be smoothly pressed into the large hole and the outer diameter of the bearing accepting portion of the holder can be expanded 0.1 mm±0.05 mm, so as to substantially match the reference outer diameter.

Further, since the outer diameter of the sleeve accepting portion of the holder is 0.2 mm±0.05 mm smaller than the reference outer diameter of the holder, when the outer diameter of the sleeve is 0.1 mm±0.05 mm larger than the inner diameter of the large hole of the holder, the sleeve can be smoothly pressed into the large hole so as to support the bearing, and the outer diameter of the sleeve accepting portion of the holder can be expanded 0.2 mm±0.05 mm to substantially match the reference outer diameter.

When the outer diameters of the bearing accepting portion and the sleeve accepting portion of the holder substantially match the reference outer diameter, the entire outer wall of the holder can be formed substantially planar, and accordingly, the outer wall of the elastic cylindrical roller, which is fitted over the holder, is also planar. Thus, while the entire outer wall of the roller precisely contacts the magnetic tape, the magnetic tape can be smoothly and stably conveyed without being shifted vertically, and a high quality image can be reproduced without any accompanying noise. The advantage of an inexpensive and mass produced synthetic resin holder can be obtained, and conventional shortcomings, such as the diametrically expansion of a portion of the outer wall of the roller, can be fully resolved.

According to a second aspect of the invention, a pinch roller device is provided wherein an elastic cylindrical roller is fitted over a cylindrical holder, in the inner wall of which are formed a small hole and a large hole; wherein a bearing is fitted in the large hole and a bearing stopper sleeve is pressed into the large hole, so that the bearing can be rotatably fitted over a roller shaft; wherein the elastic cylindrical holder is formed of an elastic synthetic resin; and wherein the outer diameter of a sleeve accepting portion of the elastic cylindrical holder is set smaller, by a width equivalent to the expansion produced by the insertion of the sleeve, than the reference outer diameters of a portion other than the sleeve accepting portion and a bearing accepting portion of the elastic cylindrical holder.

According to this arrangement, even when the sleeve accepting portion of the holder is expanded by forcibly inserting the sleeve into the large hole of the holder, the entire outer wall of the holder can be formed so it is substantially planar, because the outer diameter of the sleeve accepting portion is set smaller by a distance equivalent to the expansion of the diameter. Accordingly, the outer wall of the elastic cylindrical roller that is fitted over the holder is substantially planar. Therefore, while the entire outer wall of the roller securely contacts magnet tape, the magnetic tape can be smoothly and stably conveyed without being shifted vertically, so that a high quality image can be reproduced without any accompanying noise. Thus, the advantage afforded by an inexpensive and mass-produced synthetic resin holder can be achieved, and the conventional shortcoming whereof a portion of the roller is diametrically expanded can be fully resolved.

According to a third aspect of the invention, in the pinch roller device of the second aspect, the outer diameter of the sleeve accepting portion of the elastic cylindrical holder is set 0.2 mm±0.05 mm smaller than the reference outer diameter of the elastic cylindrical holder.

According to this arrangement, since the outer diameter of the sleeve accepting portion of the holder is 0.2 mm±0.05 mm smaller than the reference outer diameter of the holder, when the outer diameter of the sleeve is 0.1 mm±0.05 mm larger than the inner diameter of the large hole of the holder, the sleeve can be smoothly pressed into the large hole so as to support the bearing, and the outer diameter of the sleeve accepting portion of the holder can be expanded 0.2 mm±0.05 mm to substantially match the reference outer diameter.

According to a fourth aspect of the invention, in the pinch roller device of the second or third aspect, the outer wall of the bearing accepting portion of the elastic cylindrical holder is set smaller than the reference outer diameter of the elastic cylindrical holder a distance equivalent to the expansion due to the insertion of the bearing.

According to this arrangement, even when the bearing accepting portion of the holder is expanded by forcibly inserting the bearing into the large hole of the holder, the entire outer wall of the holder can be formed so it is substantially planar, because the outer diameter of the bearing accepting portion is set smaller by a distance equivalent to the expansion of the diameter. Accordingly, the outer wall of the elastic cylindrical roller that is fitted over the holder is substantially planar. Therefore, while the entire outer wall of the roller securely contacts magnet tape, the magnetic tape can be smoothly and stably conveyed without being shifted vertically, so that a high quality image can be reproduced without any accompanying noise. Thus, the advantage afforded by an inexpensive and mass-produced synthetic resin holder can be achieved, and the conventional shortcoming whereof a portion of the roller is diametrically expanded can be fully resolved.

According to a fifth aspect of the invention, in the pinch roller device of the fourth aspect, the outer wall of the bearing accepting portion of the holder is set 0.1 mm±0.05 mm smaller than the reference outer diameter of the elastic cylindrical holder.

According to this arrangement, since the outer diameter of the bearing accepting portion of the holder is 0.1 mm±0.05 mm smaller than the reference outer diameter of the holder, when the outer diameter of the bearing is 0.1 mm±0.05 mm larger than the inner diameter of the large hole of the holder, the bearing can be smoothly pressed into the large hole and the outer diameter of the bearing accepting portion of the holder can be expanded 0.1 mm±0.05 mm, so as to substantially match the reference outer diameter.

DETAILED DESCRIPTION OF THE PREFERRED EMBODIMENTS

Figure 1:
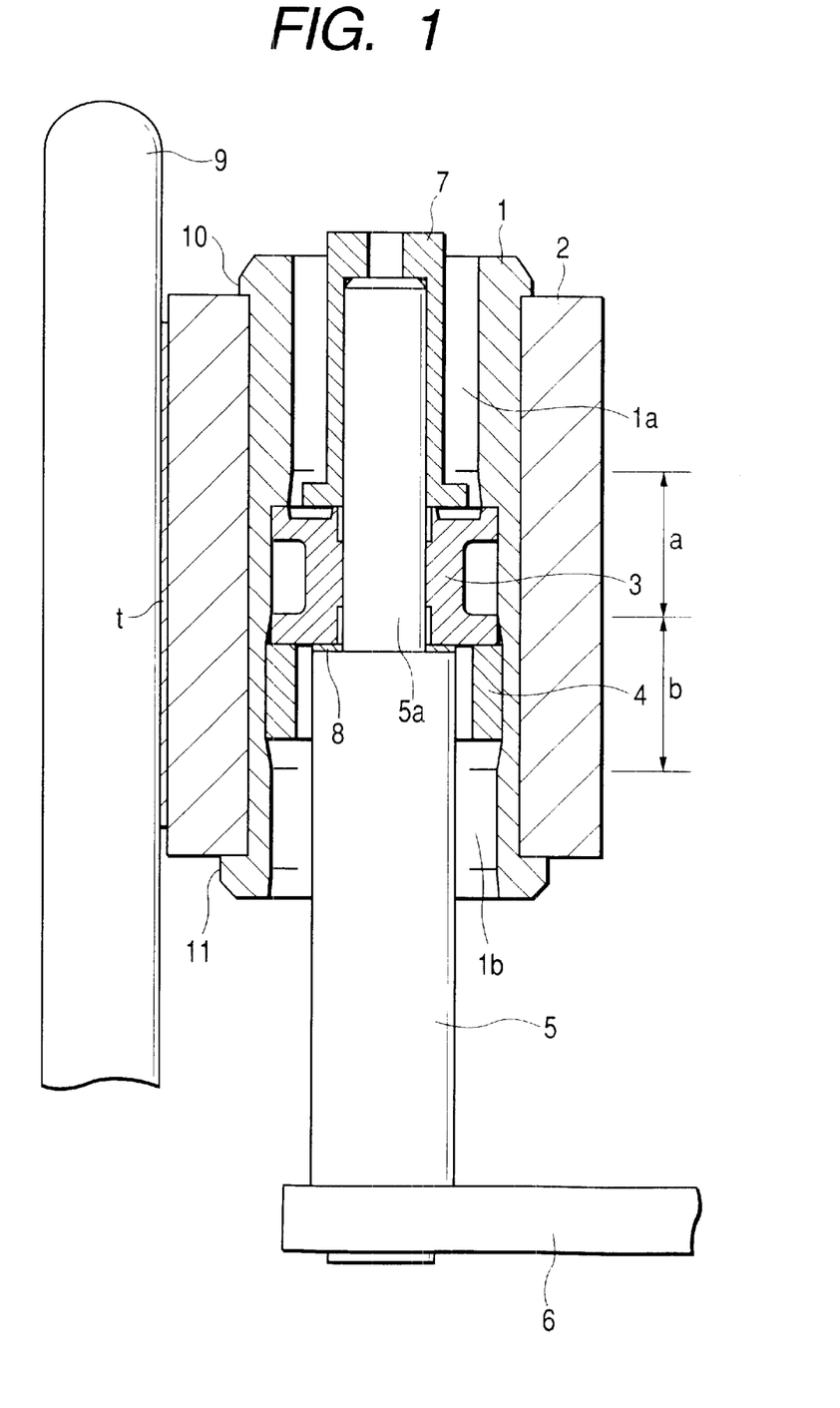
FIG. 1 is a vertical cross-sectional view of a pinch roller device according to one embodiment of the present invention.
Figure 2A:
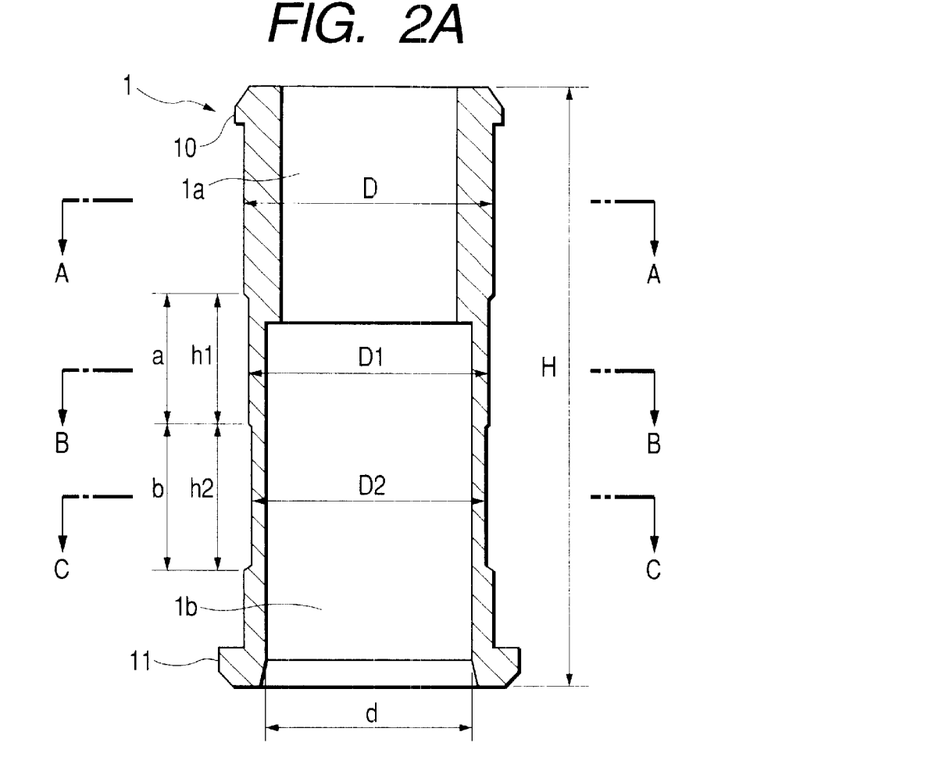
FIG. 2A is a vertical cross-sectional view of a holder in FIG. 1.
Figure 2B:
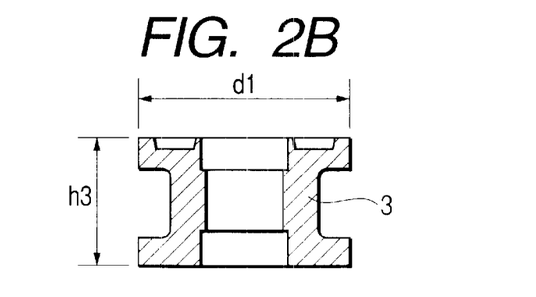
FIG. 2B is a vertical cross-sectional view of a bearing in FIG. 1.
Figure 2C:
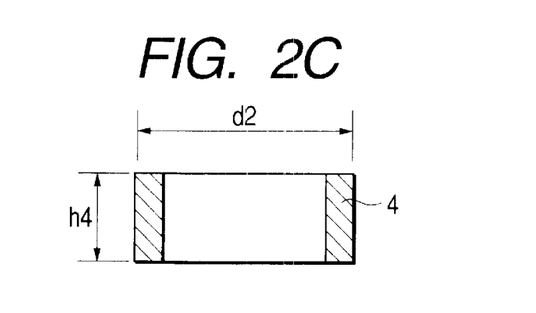
FIG. 2C is a vertical cross-sectional view of a sleeve in FIG. 1.
Figure 3A:
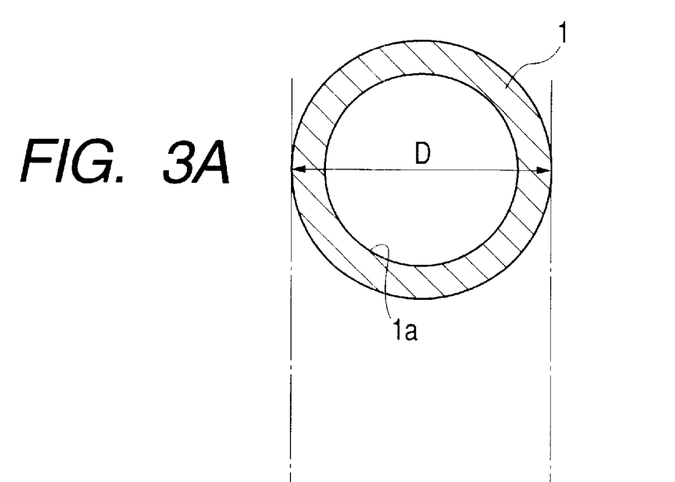
FIG. 3A is a diagram viewed in direction A—A in FIG. 2.
Figure 3B:
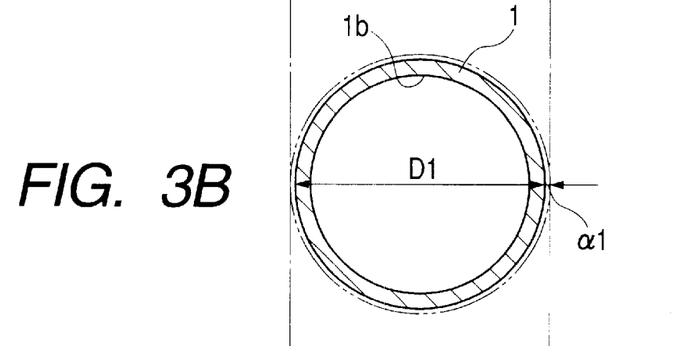
FIG. 3B is a diagram viewed in direction B—B in FIG. 2.
Figure 3C:
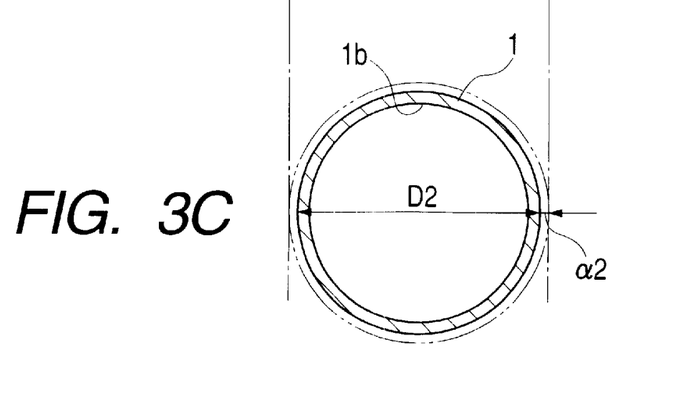
FIG. 3C is a diagram viewed in direction C—C in FIG. 2.

FIGS. 1 to 3 are diagrams showing a pinch roller device according to one embodiment of the invention. A holder 1 is formed of an elastic synthetic resin, and the outer diameter D1 of a bearing accepting portion a of the holder 1 is set smaller than a reference outer diameter D a distance (0.1 mm±0.05 mm) equivalent to an expanded width α1 attributable to the insertion of a bearing 3. An outer diameter D2 of a sleeve accepting portion b of the holder 1 is set smaller than the reference outer diameter D a distance (0.2 mm±0.05 mm) equivalent to an expanded width α2 attributable to the insertion of a sleeve 4. The same reference numerals as are used for the arrangement in FIGS. 5 to 7 are also used to denote corresponding components in the arrangement for this embodiment.

According to the arrangement, since the outer diameter D1 of the bearing accepting portion a of the holder 1 is 0.1 mm±0.05 mm smaller than the reference outer diameter D of the holder 1, when an outer diameter d1 of the bearing 3 is set 0.1 mm±0.05 mm larger than an inner diameter d of a large hole 1b in the holder 1, the bearing 3 can be smoothly and accurately pushed into the large hole 1b, and the outer diameter D1 of the bearing accepting portion a of the holder 1 can be expanded 0.1 mm±0.05 mm so as to substantially match the reference outer diameter D.

Further, since the outer diameter D2 of the sleeve accepting portion b of the holder 1 is set 0.2mm±0.05 mm smaller than the reference outer diameter D of the holder 1, when the outer diameter d2 of the sleeve 4 is set 0.2 mm±0.05 mm larger than the inner diameter d of the large hole 1b of the holder 1, the sleeve 4 can be smoothly and securely pressed into the large hole 1b and support the bearing 3, and the outer diameter D2 of the sleeve accepting portion b of the holder 1 can be expanded 0.2 mm±0.05 mm so as to substantially match the reference outer diameter D.

When the outer diameters D1 and D2 of the bearing accepting portion and the sleeve accepting portion b of the holder 1 substantially match the reference outer diameter D, the entire outer wall of the holder 1 can be formed so that it is substantially planar, and the outer wall of the elastic cylindrical roller 2, which is fitted over the holder 1, is also so formed that it is planar. Thus, while the entire outer wall of the roller 2 securely contacts the magnetic tape t, the magnetic tape t can be smoothly and stably conveyed without being shifted vertically, and a high quality image that is not accompanied by noise can be reproduced. Therefore, the advantage afforded by an inexpensive and mass-produced synthetic resin holder 1 can be realized, and the conventional shortcoming whereof a portion of the outer wall of the roller 2 is diametrically expanded can be resolved.

As specific sizes, the entire length H of the holder 1 is 20.5 mm; the width h1 of the bearing accepting portion a is 3.5 mm; and the width h2 of the sleeve accepting portion b is 5 mm. The reference outer diameter D is 8.5 mm, and the outer diameter D1 of the bearing accepting portion a is 8.4 mm. And the outer diameter D2 of the sleeve accepting portion b is 8.3 mm, and the inner diameter d of the large hole 1b is 7 mm.

Further, the height h3 of the bearing 3 is 4.5 mm, and the outer diameter d1 is 7.1 mm. The height h4 of the sleeve 4 is 3 mm, and the outer diameter d2 is 7.2 mm. And when the bearing 3 and the sleeve 4 are pressed into the large hole 1b, the outer diameter D1 of the bearing accepting portion a is increased by 0.1 mm, and the outer diameter D2 of the sleeve accepting portion b is increased by 0.2 mm. Therefore, the outer diameters D1 and D2 are set to 8.5 mm, the same as the reference outer diameter D, so that the outer wall of the holder 1 is substantially planar.

With this arrangement, the outer diameter D1 of the bearing accepting portion a is 8.4 mm, and the outer diameter D2 of the sleeve accepting portion b is 8.3mm. However, for accuracy, ±0.05 mm is a permissible range. When, for the reference outer diameter D of 8.5 mm, the outer diameter D1 of the bearing accepting portion a falls within the range of from 8.35 to 8.45 mm and the outer diameter D2 of the sleeve accepting portion b falls within the range of from 8.25 to 8.35 mm, the conventional shortcoming described above can be resolved.

According to the first aspect of the invention, since the outer diameter of the bearing accepting portion of the holder is 0.1 mm±0.05 mm smaller than the reference outer diameter of the holder, when the outer diameter of the bearing is 0.1 mm±0.05 mm larger than the inner diameter of the large hole of the holder, the bearing can be smoothly pressed into the large hole and the outer diameter of the bearing accepting portion of the holder can be expanded 0.1 mm±0.05 mm, so as to substantially match the reference outer diameter.

Further, since the outer diameter of the sleeve accepting portion of the holder is 0.2 mm±0.05 mm smaller than the reference outer diameter of the holder, when the outer diameter of the sleeve is 0.1 mm±0.05 mm larger than the inner diameter of the large hole of the holder, the sleeve can be smoothly pressed into the large hole so as to support the bearing, and the outer diameter of the sleeve accepting portion of the holder can be expanded 0.2 mm±0.05 mm to substantially match the reference outer diameter.

When the outer diameters of the bearing accepting portion and the sleeve accepting portion of the holder substantially match the reference outer diameter, the entire outer wall of the holder can be formed substantially planar, and accordingly, the outer wall of the elastic cylindrical roller, which is fitted over the holder, is also planar. Thus, while the entire outer wall of the roller precisely contacts the magnetic tape, the magnetic tape can be smoothly and stably conveyed without being shifted vertically, and a high quality image can be reproduced without any accompanying noise. The advantage of an inexpensive and mass produced synthetic resin holder can be obtained, and conventional shortcomings, such as the diametrically expansion of a portion of the outer wall of the roller, can be fully resolved.

According to the second aspect of the invention, even when the sleeve accepting portion of the holder is expanded by forcibly inserting the sleeve into the large hole of the holder, the entire outer wall of the holder can be formed so it is substantially planar, because the outer diameter of the sleeve accepting portion is set smaller by a distance equivalent to the expansion of the diameter. Accordingly, the outer wall of the elastic cylindrical roller that is fitted over the holder is substantially planar. Therefore, while the entire outer wall of the roller securely contacts magnet tape, the magnetic tape can be smoothly and stably conveyed without being shifted vertically, so that a high quality image can be reproduced without any accompanying noise. Thus, the advantage afforded by an inexpensive and mass-produced synthetic resin holder can be achieved, and the conventional shortcoming whereof a portion of the roller is diametrically expanded can be fully resolved.

According to the third aspect of the invention, since the outer diameter of the sleeve accepting portion of the holder is 0.2 mm±0.05 mm smaller than the reference outer diameter of the holder, when the outer diameter of the sleeve is 0.1 mm±0.05 mm larger than the inner diameter of the large hole of the holder, the sleeve can be smoothly pressed into the large hole so as to support the bearing, and the outer diameter of the sleeve accepting portion of the holder can be expanded 0.2 mm±0.05 mm to substantially match the reference outer diameter.

According to the fourth aspect of the invention, even when the bearing accepting portion of the holder is expanded by forcibly inserting the bearing into the large hole of the holder, the entire outer wall of the holder can be formed so it is substantially planar, because the outer diameter of the bearing accepting portion is set smaller by a distance equivalent to the expansion of the diameter. Accordingly, the outer wall of the elastic cylindrical roller that is fitted over the holder is substantially planar. Therefore, while the entire outer wall of the roller securely contacts magnet tape, the magnetic tape can be smoothly and stably conveyed without being shifted vertically, so that a high quality image can be reproduced without any accompanying noise. Thus, the advantage afforded by an inexpensive and mass-produced synthetic resin holder can be achieved, and the conventional shortcoming whereof a portion of the roller is diametrically expanded can be fully resolved.

According to the fifth aspect of the invention, since the outer diameter of the bearing accepting portion of the holder is 0.1 mm±0.05 mm smaller than the reference outer diameter of the holder, when the outer diameter of the bearing is 0.1 mm±0.05 mm larger than the inner diameter of the large hole of the holder, the bearing can be smoothly pressed into the large hole and the outer diameter of the bearing accepting portion of the holder can be expanded 0.1 mm±0.05 mm, so as to substantially match the reference outer diameter.

What is claimed is:

1. A pinch roller device comprising:

a cylindrical holder;

an elastic cylindrical roller fitted over said cylindrical holder, in an inner wall of which a small hole and a large hole are formed;

a bearing fitted in the large hole; and a bearing stopper sleeve pressed into the large hole, so that said bearing is rotatably fitted over a roller shaft; wherein said cylindrical holder is formed of an elastic synthetic resin;

an outer diameter of a sleeve accepting portion of said cylindrical holder is set 0.2 mm±0.05 mm smaller than a reference outer diameter of a portion other than said sleeve accepting portion and a bearing accepting portion of said cylindrical holder; and an outer diameter of said bearing accepting portion is set 0.1 mm±0.05 mm smaller than said reference outer diameter.

2. A pinch roller device comprising:

a cylindrical holder;

an elastic cylindrical roller fitted over said cylindrical holder, in an inner wall of which a small hole and a large hole are formed;

a bearing fitted in the large hole; and a bearing stopper sleeve pressed into the large hole, so that said bearing is rotatably fitted over a roller shaft; wherein said cylindrical holder is formed of an elastic synthetic resin; and an outer diameter of a sleeve accepting portion of said cylindrical holder is set smaller, by a width equivalent to an expansion produced by an insertion of said sleeve, than a reference outer diameters of a portion other than said sleeve accepting portion and a bearing accepting portion of said cylindrical holder.

3. The pinch roller device according to claim 2, wherein the outer diameter of said sleeve accepting portion of said cylindrical holder is set 0.2 mm±0.05 mm smaller than said reference outer diameter of said cylindrical holder.

4. The pinch roller device according to claim 2, wherein an outer diameter of said bearing accepting portion of said cylindrical holder is set smaller than said reference outer diameter of said cylindrical holder a distance equivalent to an expansion due to an insertion of said bearing.

5. The pinch roller device according to claim 4, wherein the outer diameter of said bearing accepting portion of said cylindrical holder is set 0.1 mm±0.05 mm smaller than said reference outer diameter of said cylindrical holder.

* * * * *